No. 621,590. Patented Mar. 21, 1899.
J. V. WELLS.
ENGINEER'S BRAKE VALVE.
(Application filed Apr. 12, 1898.)
(No Model.)
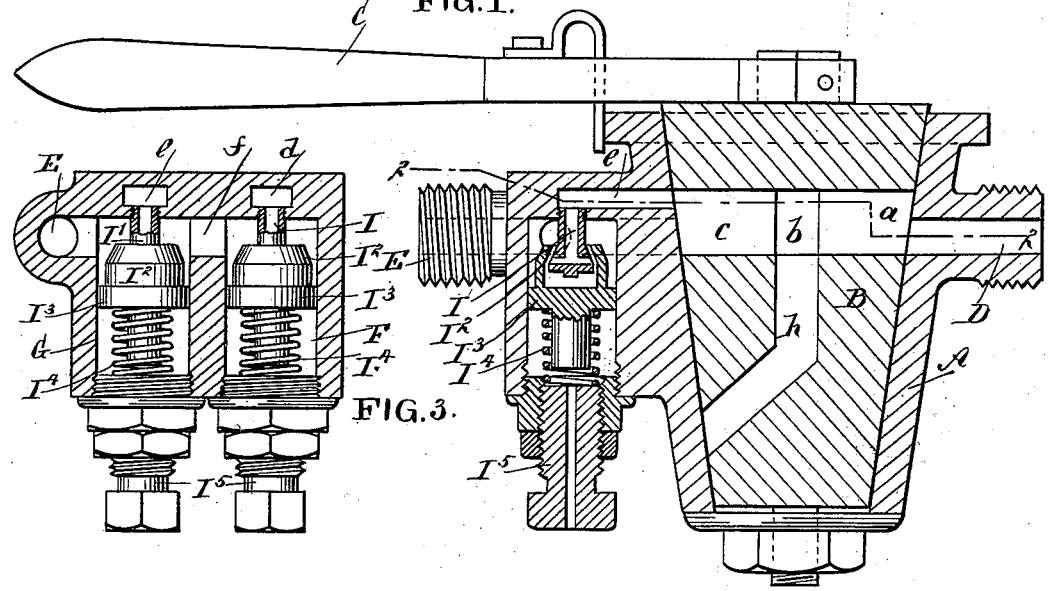
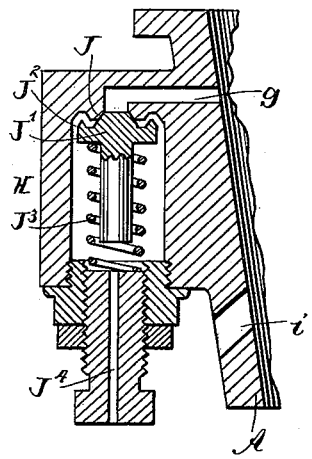
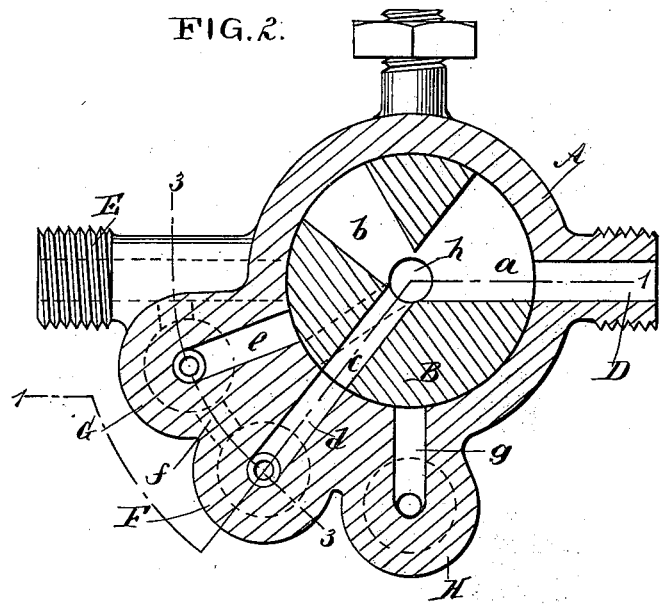
WITNESSES:
INVENTOR
J. V. Wells
BY
ATTORNEYS.

UNITED STATES PATENT OFFICE.

JOHN V. WELLS, OF WILMERDING, PENNSYLVANIA.

ENGINEER'S BRAKE-VALVE.

SPECIFICATION forming part of Letters Patent No. 621,590, dated March 21, 1899.

Application filed April 12, 1898. Serial No. 677,285. (No model.)

*To all whom it may concern:*

Be it known that I, JOHN V. WELLS, of Wilmerding, in the county of Allegheny and State of Pennsylvania, have invented a new and Improved Engineer's Brake-Valve, of which the following is a full, clear, and exact description.

The invention relates to fluid-pressure brakes, and is more especially designed for use in connection with a brake supplied with my improved triple valve, for which I filed an application for Letters Patent of the United States on October 2, 1897, Serial No. 653,814, and which was allowed on January 28, 1898, and also relates to a second application for a triple valve filed of even date herewith.

The object of my invention is to provide a new and improved engineer's brake-valve which is simple and durable in construction and arranged to permit of charging the train-pipe to full main-reservoir pressure or to a predetermined reduced pressure to charge the auxiliary reservoir accordingly; also, to allow of a release to ordinary pressure or an emergency release of the air from the train-pipe to apply the brakes.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2, showing the valve in running position. Fig. 2 is a sectional plan view of the same on the line 2 2 of Fig. 1 and with the valve-plug in a different position. Fig. 3 is a transverse section of the same on the line 3 3 of Fig. 2, and Fig. 4 is a transverse section of the release-valve and part of the valve-body.

The improved engineer's brake-valve is provided with a valve-body A, in which is mounted to turn a valve-plug B, provided with a handle C, under the control of the engineer, to turn the plug to the desired position, as hereinafter more fully described.

The valve-body A is provided at one side with a nipple D for connection with the main reservoir, and on the opposite side is arranged a train-pipe connection E for connection with the train-pipe. On the valve-body A are also arranged the feed-valves F and G and the release-valve H. The said feed-valves are set to different pressures, as hereinafter more fully described. The valve-plug B is provided with an enlarged port $a$, adapted to register with the main-reservoir connection D, and in the body A is also formed a port $b$, leading from the port $a$ and adapted to register with the train-pipe connection E. A third port $c$ leads from both ports $a$ and $b$ to connect with either of the ports $d$ or $e$, leading to the feed-valves F and G, respectively, said feed-valves being connected with each other by a port $f$, as is plainly indicated in Figs. 2 and 3. The port $c$ is also adapted to register with a port $g$, leading to the release-valve H. From the adjacent ends of the ports $a\ b\ c$ leads a central port $h$ downwardly, to then extend transversely to register with an exhaust-port $i$, formed in the valve-body A, when it is desired to make an emergency release.

The feed-valves F and G are alike in construction, and each is provided with a pipe I, connecting with the corresponding port $e$ or $d$, and formed at its lower end into a valve-seat I', having sidewise openings leading from the interior of the pipe to allow the air from the main reservoir to pass through the ports $c$ and $e$ (or $c\ d$) into the pipe I and through the valve-seat into the valve $I^2$, adapted to be seated on the valve-seat I' and carried by a piston $I^3$, fitted to slide in the valve-casing, a spring $I^4$ normally holding the piston $I^3$ in an uppermost position to allow the air to pass through the valve-seat and valve into the valve-casing and from the casing for the valve G into the train-pipe connection E. The spring $I^4$ is set by a plug $I^5$ to the desired pressure, so that upon an excess of pressure the piston $I^3$ is moved downward against the tension of the spring $I^4$ to close the valve $I^2$ on the seat I'.

In order to maintain a normal pressure in the train-pipe—say seventy pounds—the engineer turns the plug B to the position shown in Fig. 2, so that the ports $c$ and $d$ connect with each other, and the air from the reservoir can pass through the ports $a\ c\ d$ into the seat I' for the valve F, disengaged by the valve I², as this feed-valve F is set to seventy pounds pressure.

To increase the train-line pressure, the engineer turns the handle C to the left to turn the plug B and connect the port $c$ with the train-pipe connection E, the port $a$ remaining in connection with the main-reservoir connection D. When the brakes are sufficiently set, the operator swings the handle C back until the port $c$ registers with the port $e$, leading to the valve G, which is adjustable to maintain sufficient pressure in the train-line and keep the main triple-valve piston against the elastic ring or in lap position, as more fully explained in the applications above referred to. Say that the train-line pressure when increased five pounds places the triple-valve piston in lap position, then the feed-valve G is set to maintain seventy-five pounds in the train-pipe, as leakage of train-pipe pressure below seventy-five pounds will open the feed-valve G and allow air from the main reservoir to replenish the loss by way of the feed-valve G. Thus the triple valve will always remain in a lap position at a pressure of seventy-five pounds in the train-pipe. In order to release down to normal pressure, the engineer turns the plug B to bring the port $b$ in register with the train-pipe connection E and the port $c$ into register with the port $g$, so that the surplus air from the train-pipe can pass through the release-valve H until the desired reduction of pressure has taken place.

When it is desired to make a free train-line escape to the atmosphere, the engineer turns the plug B still farther to the right to connect the port $h$ with the exhaust-port $i$, the port $b$ remaining in register with the train-pipe connection, so that air can pass from the train-pipe by way of the ports $b$, $h$, and $i$ to the atmosphere for an emergency stop.

The release-valve H is preferably of the construction shown in detail in Fig. 4—that is, at the end of the port $g$ is arranged a valve-seat J, adapted to be engaged by a valve J', formed with an enlarged end J² and pressed on by a spring J³, the tension of which is regulated by a screw-plug J⁴, so that the release-valve J' can be set to the desired normal pressure.

Each of the plugs I⁵ is provided with an aperture leading to the atmosphere to permit the piston I³ to readily yield on an increase of pressure to set the valve I² on the seat I'.

Having thus fully described my invention, I claim as new and desire to secure by Letters Patent—

1. An engineer's brake-valve, provided with a plurality of feed-valves set to different pressures, and connected with each other, the valves being interposed between the valve-plug and the train-pipe connection, to supply the train-pipe with pressure from the main reservoir, according to the pressure to which one of the feed-valves is set, and to maintain an increase of pressure in the train-pipe according to the pressure to which the other valve is set, substantially as shown and described.

2. An engineer's brake-valve provided with a valve-plug for connecting the main reservoir with the train-pipe, a plurality of feed-valves set to different pressures and interposed between the valve-plug and the train-pipe connection to supply the train-pipe with pressure from the main reservoir according to the pressure to which one of the feed-valves is set, and to maintain an increase of pressure in the train-pipe according to the pressure to which the other valve is set, and a release-valve arranged for connection by the said valve-plug with the train-pipe to reduce the train-line pressure to the normal, substantially as shown and described.

3. An engineer's brake-valve comprising a valve-plug, a feed-valve set to maintain a desired normal pressure in the train-pipe and arranged for connection by the valve-plug with the main reservoir, to supply the train-pipe with the desired normal pressure, the train-pipe connection and main reservoir being arranged for direct connection with each other by the valve-plug to increase the train-line pressure, a second feed-valve arranged for connection by the said valve-plug with the main reservoir, and set to maintain an increase of pressure in the train-pipe the said train-pipe being arranged for connection by the said valve-plug with an exhaust-port to make a free train-line escape to the atmosphere, substantially as shown and described.

4. An engineer's brake-valve comprising a valve-body provided with a main-reservoir connection and a train-pipe connection, feed-valves set to different pressures, and connected with each other by a port, a release-valve, and a valve-plug mounted to turn in said valve-body and provided with ports adapted to register with the main-reservoir connection and the train-pipe connection respectively, the said valve-plug being also provided with a port adapted to connect with ports leading to the feed-valves and also with a port leading to the release-valve, the said valve-plug being further provided with a central port leading from the other ports in the valve-plug and adapted to register with an exhaust-port formed in the valve-body, substantially as set forth.

5. In an engineer's brake-valve, a feed-valve comprising a pipe connected with a pressure-supply and formed at one end into a valve-seat having openings leading from the interior of the pipe, a piston carrying a valve adapted to engage the said seat, the openings in the pipe allowing the air to pass into the valve, a spring pressing the said piston to hold the valve normally off its seat and to allow the piston to yield on an increase of pressure to seat the valve, and a plug for adjusting the spring to the desired pressure, the said plug being provided with an aperture leading to the atmosphere, substantially as described.

JOHN V. WELLS.

Witnesses:
 FRANK MCCANN,
 R. M. HOLLAND.